(12) United States Patent
Beck

(10) Patent No.: US 7,028,709 B2
(45) Date of Patent: Apr. 18, 2006

(54) ONE-WAY VALVE WITH POPPET MEMBER

(76) Inventor: Douglas S. Beck, 3319 21st Ave. NW., Gig Harbor, WA (US) 98335

( * ) Notice: Subject to any disclaimer, the term of this patent is extended or adjusted under 35 U.S.C. 154(b) by 48 days.

(21) Appl. No.: 10/691,329

(22) Filed: Oct. 21, 2003

(65) Prior Publication Data
US 2005/0081922 A1   Apr. 21, 2005

(51) Int. Cl.
*F16K 15/02* (2006.01)
(52) U.S. Cl. .............. 137/528; 137/269.5; 137/512.1; 137/515.5; 251/333
(58) Field of Classification Search ............ 137/512.1, 137/515, 515.5, 528, 269.5; 251/332, 333, 251/334
See application file for complete search history.

(56) References Cited
U.S. PATENT DOCUMENTS 1,971,659 A * 8/1934 Ruthven ..................... 137/243
2,598,630 A * 5/1952 Winberg .................... 137/514.7
2,748,798 A * 6/1956 Withrow ................. 137/533.17
3,189,046 A * 6/1965 Callahan et al. .......... 137/515.7
6,823,893 B1 * 11/2004 Hebmuller ............. 137/533.17
6,877,524 B1 * 4/2005 Vasilev ........................ 137/528

\* cited by examiner

*Primary Examiner*—Ramesh Krishnamurthy
(74) *Attorney, Agent, or Firm*—Jensen & Puntigam, P.S.

(57) ABSTRACT

The valve includes a supply portion, a delivery portion and an intermediate fluid chamber; a poppet member is positioned within the fluid chamber and is adapted to move within the chamber, the poppet including a conical seating surface and a rim portion, the rim portion having openings therethrough into the open interior of the poppet, allowing for forward fluid flow through the poppet. A delivery poppet seat and a supply poppet seat are defined at opposite ends of the fluid chamber. The delivery poppet seat is configured so that when the rim portion of the poppet contacts the delivery seat, fluid flow in the forward direction is permitted. The supply poppet seat is configured such that when the conical seating surface of the poppet member contacts the supply poppet seat, backflow through the valve is substantially prevented.

9 Claims, 2 Drawing Sheets

ONE-WAY VALVE WITH POPPET MEMBER

TECHNICAL FIELD

This invention relates generally to fluid valves, and more particularly concerns a one-way valve using a poppet member to control the flow of fluid therethrough.

BACKGROUND OF THE INVENTION

In a one-way fluid valve, fluid is permitted to flow freely, with little resistance, in one direction, referred to as forward flow. Fluid is also generally prevented from flowing in the opposite direction through the valve, referred to as backflow, i.e. the valve presents a high resistance to fluid backflow.

Examples of such one-way valves include reed valves and conventional poppet check valves. Reed valves use thin flaps of metal, referred to as reeds, to cover a supply port to limit fluid backflow when the pressure at the supply port is less than the delivery pressure. When the pressure at the supply port is greater than the delivery pressure, the reeds bend to permit forward fluid flow through the valve.

Conventional poppet check valves include a moving poppet member which covers the supply port to limit fluid backflow when the pressure at the supply port is less than the delivery pressure. When the pressure at the supply port is greater than delivery pressure, the poppet member moves to uncover the supply port to permit forward flow of the fluid through the valve.

Reed valves and poppet check valves have known disadvantages. The thin metal reeds in the reed valves fatigue and break, due to high cycle bending in use. The poppets in the poppet check valves are typically heavy and hence have large inertia, so that they are not useful in applications that require high frequency cyclical operation. Further, conventional poppet check valves have complex flow paths, requiring special purpose housings. Off-the-shelf commercial components and material cannot be used to make poppet check valves.

Accordingly, it is desirable to have a reliable and long-lived one-way valve that is inexpensive and capable of high-frequency cyclical operation.

SUMMARY OF THE INVENTION

Accordingly, the present invention includes a one-way fluid valve, comprising: a valve housing which includes a fluid supply section, including an entry port, and a delivery section, the housing further including a fluid chamber which receives fluid entering through the supply section and which is in fluid communication with the delivery section for delivery of fluid out of the valve; a poppet member positioned within the fluid chamber and free to move within the fluid chamber during operation of the valve, the poppet including a seating surface portion and a rim portion which includes passages therethrough which permit flow of fluid through the poppet member; a delivery poppet seat defined within the fluid chamber, which the rim portion of the poppet contacts during forward flow of fluid through the valve; and a supply poppet seat defined within the fluid chamber which the seating surface portion of the poppet contacts to minimize backflow of fluid through the valve during backflow of fluid into the fluid chamber.

BEST MODE FOR CARRYING OUT THE INVENTION

Figure 1A:
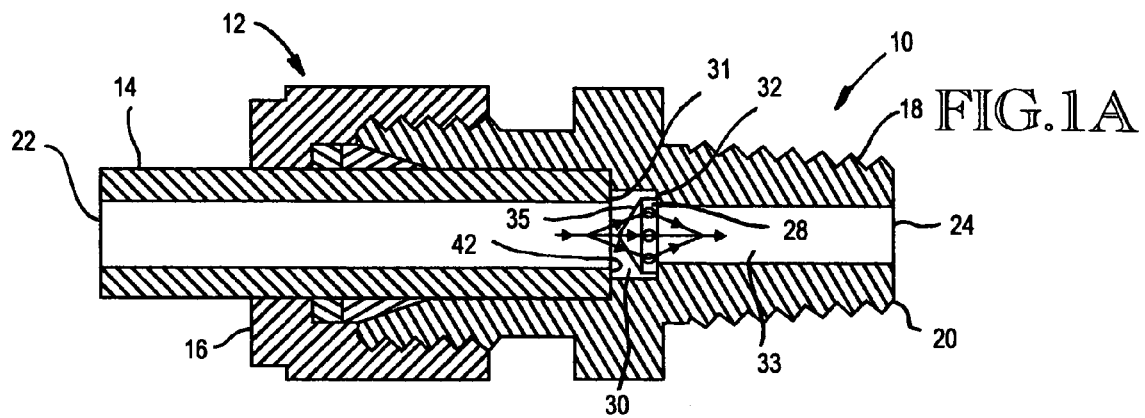
FIGS. 1A and 1B are cross-sectional views of one embodiment of the one-way valve of the present invention, showing fluid flow in the forward direction (1A) and resistance to back flow (1B).
Figure 1B:
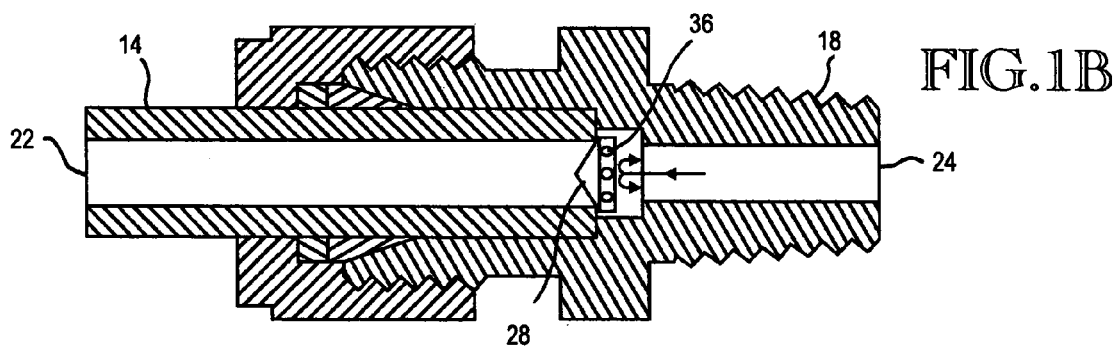

FIGS. 1A and 1B show a first embodiment of the one-way valve of the present invention. The valve 10 includes a compression fitting 12 with a supply tube 14 at a supply end 16 of the compression fitting and a threaded portion 18 formed in a delivery end 20 of the fitting. The compression fitting 12, with its threaded portion 18, and supply tube 14, are conventional, off-the-shelf elements.

Valve 10 is referred to generally as an inlet valve, since the supply tube 14 receives fluid through an inlet port/opening 22, while the threaded portion 18 includes a delivery port/opening 24.

In operation, fluid is moved in the forward direction between inlet port 22 and delivery port 24. Valve 10 further includes a poppet member 28 located in a fluid chamber 30 located between an interior end 31 of supply tube 14 and an inboard end surface 32 at longitudinal opening 33 in threaded portion 18. Poppet member 28 has a small mass and therefore a small inertia.

Figure 3A:
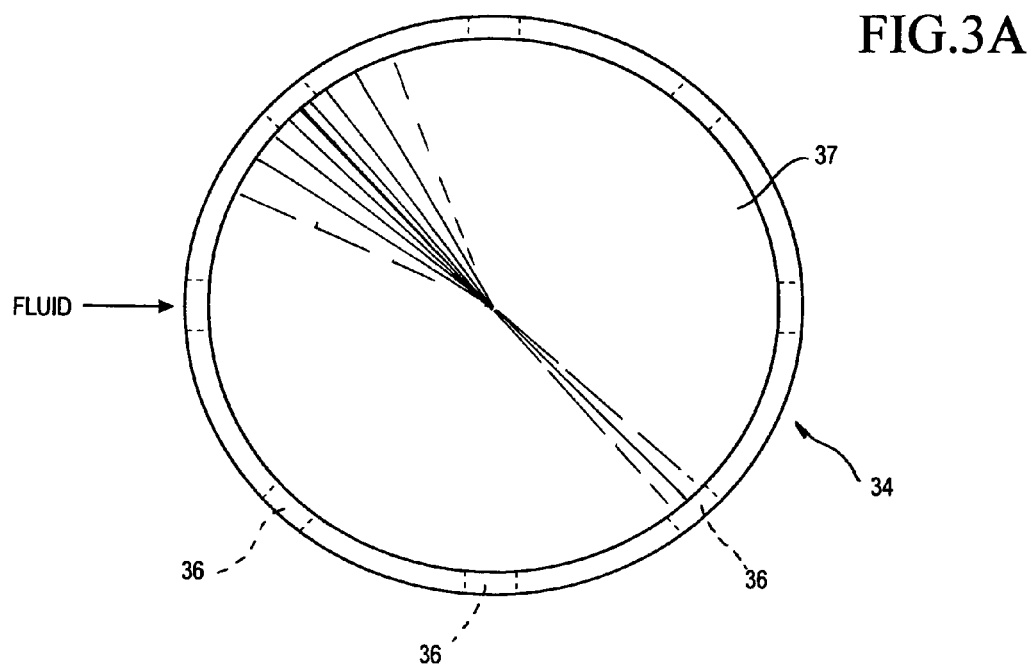
FIGS. 3A, 3B and 3C are top, side elevation and cross-sectional views of the poppet portion of the one-way valve of FIGS. 1A and 1B and 2A and 2B.
Figure 3B:
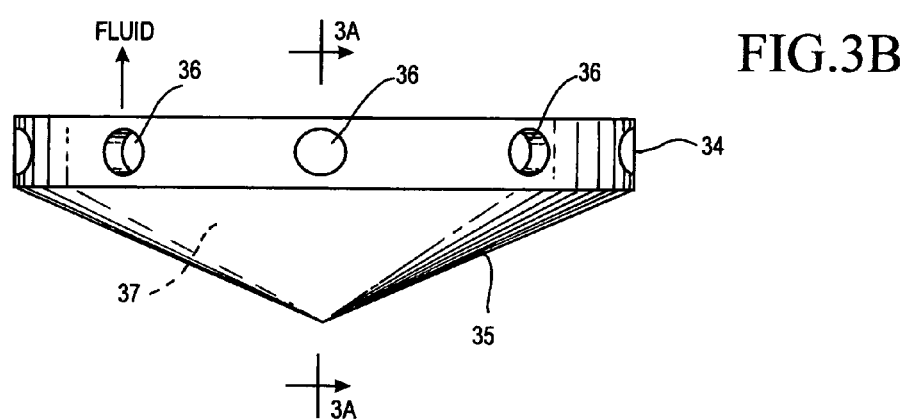
Figure 3C:
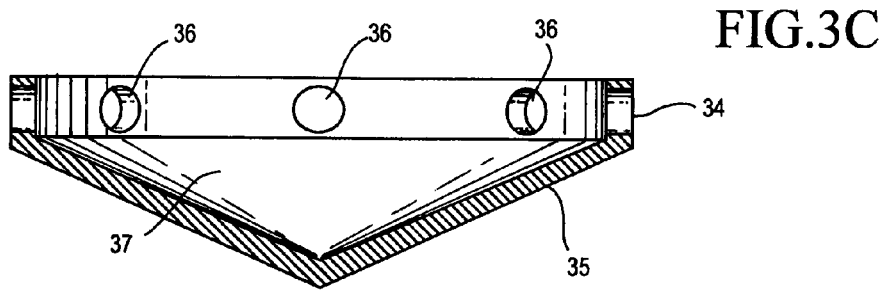

Referring now to FIGS. 3A–3C in the embodiment shown, poppet 28 has a base or rim portion 34 and a conical portion 35 which extends away from the rim portion 34. The base of conical portion 35 has an outside diameter which is substantially identical to the outside diameter of rim portion 34. Rim portion 34 has a plurality of openings 36 which permit fluid flow into interior 37 of the poppet 18 through openings 36 and then out of the poppet. The poppet 28 is configured relative to the diameter of the inboard end 31 of the supply tube and the inboard end surface 32 at opening 33 such that when the one-way valve is in its open position, a base surface 38 of the poppet seats against inboard end surface 32.

In operation, fluid will be delivered through supply tube 14 into fluid chamber 30, and then through poppet 28 to delivery port 24. This is forward fluid flow.

When valve 10 is closed, conical portion 35 of the poppet mates or seats against an inner peripheral edge 42 of the inboard end 31 of supply tube 14. This arrangement limits backflow, since there is no clear path for the fluid to move through or past poppet 28 into the tube 14.

In one embodiment, inner peripheral edge 42 of inboard end 31 of the supply tube is made from a significantly softer material from that of poppet member 28, so that edge 42 deforms to accommodate irregularities in the poppet rim base surface, so as to minimize leakage between poppet 28 and the inner peripheral edge 42 of inboard end surface 32.

As indicated above, inner peripheral edge 42 can be made of material which is significantly softer than the material from which the poppet 28 is made, so that the edge 42 deforms to accommodate irregularities in the poppet surface, to minimize backflow. These irregularities can result from imperfections during the manufacturing process, scratches or other blemishes caused by contaminants in the fluid flow, or the result of normal wear. The inner peripheral edge 42 can be sharp, sometimes referred to as a knife edge, which when mating with a poppet surface (the conical portion 35)

provides only very limited opportunities for leakage between the cone portion of the poppet and the knife edge supply tube seating surface.

The poppet can be lightweight, with a relatively small inertia, so that it can move rapidly to accommodate high-speed opening and closing cycles. For instance, in a valve like that shown in FIGS. 1A and 1B, where the openings through the supply tube 14 and through the threaded portion 18 are approximately 0.312 (5/16) inches in diameter, respectively, with the poppet being approximately 0.375 (3/8) inches in diameter at its base, with a height of 0.200 inches, the poppet could weigh within the range of 0.1–1 grams.

Poppet 28 may be made from material such as stainless steel, which can be significantly harder than the material comprising either the inboard end of the threaded portion 18 or the inboard end of the supply tube 14. The advantage of the poppet being made from hard material is that it is resistant to wear.

Since the valve is formed by a readily available compression fitting and a single piece of tube, the embodiment shown is inexpensive to manufacture, since only simple manufacturing steps are required to assemble the valve, from off-the-shelf commercial components. The poppet is the only component which must be custom manufactured.

Figure 2A:
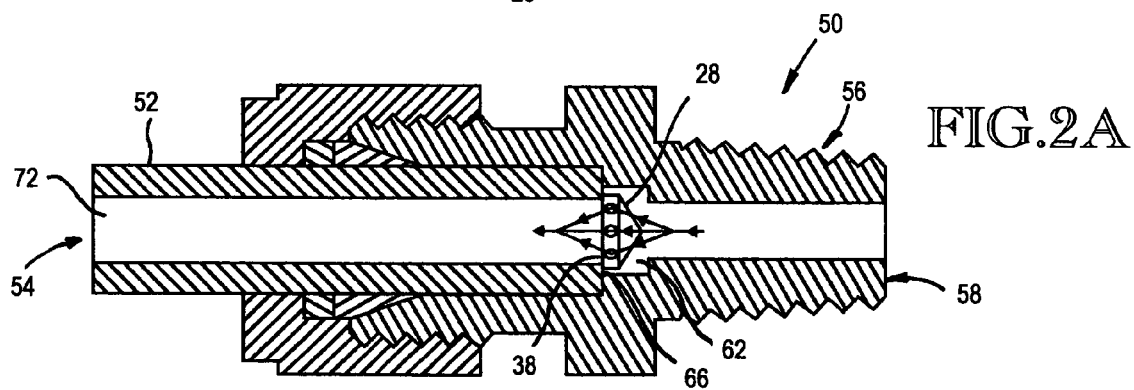
FIGS. 2A and 2B are cross-sectional views of an alternative embodiment to the one-way valve of FIGS. 1A and 1B.
Figure 2B:
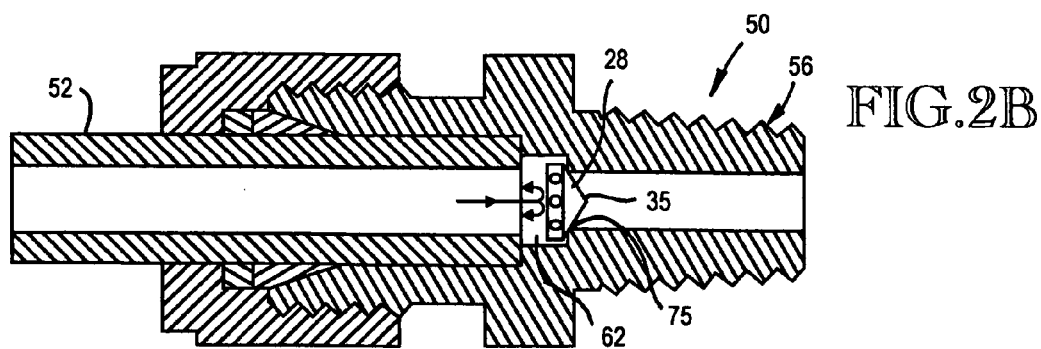

The poppet 28 shown in FIGS. 1A and 1B, in an inlet valve arrangement, in which the fluid moves into the valve at supply tube 14 and out through threaded portion 18, can be reversed, so that the fluid supply is located at the threaded portion of the valve and the delivery of the fluid is at the outboard end of the tube. FIGS. 2A and 2B show such an arrangement, referred to as an outlet valve. These figures show a similar compression fitting 30 to that shown at 12 in FIGS. 1A and 1B. The complete valve is referred to in general at 50 in FIGS. 2A and 2B. It includes a tube 52 at one end 54 of the compression fitting, with a threaded portion 56 formed in the other end 58 of the fitting.

In the arrangement of FIGS. 2A and 2B, fluid enters the valve at end 58 through threaded portion 56 and exits the valve at end 54 through the tubular portion 52.

As discussed above, poppet 28 is reversed in fluid chamber 62 in FIGS. 2A and 2B relative to its position in the embodiment of FIGS. 1A and 1B. FIG. 2A shows the position of the poppet during forward flow operation of the valve, in which fluid moves through the valve 50, while FIG. 2B shows the position of the poppet when it is limiting backflow back through the valve. When the one-way valve 50 is in its open position, rim base surface 38 of poppet 28 seats against seating surface 66 at the inboard end of tubular portion 52. In this position, fluid in the threaded portion 56 flows into fluid chamber 62, enters poppet 28 through radial openings 36 at the rim base portion of the poppet into the interior 37 thereof and then through tube 52, and out delivery opening 72 in tubular portion 52 of the valve.

When the one-way valve 50 is closed, with poppet 28 in the position shown in FIG. 2B, backflow is limited since there is no clear path for the fluid to move through or past the poppet into tube 52. Further, conical surface 35 of poppet 28 contacts circumferentially the seating surface edge (knife edge) 75 of the threaded portion 56. Hence, there is typically a good, continuous contact between the poppet conical surface 35 and the circumferential seating edge of the threaded portion of the valve, substantially preventing fluid from escaping between the conical portion 35 and the seating surface edge.

Accordingly, a new one-way valve has been disclosed, which involves a compression fitting and a tube which are readily commercially available and a poppet which operates between two extreme positions to permit fluid flow in the forward direction, but substantially prevent (limit) fluid flow in the reverse direction.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A one-way fluid valve, comprising:
    a valve housing which includes a fluid supply section, including an entry port, and a delivery section, the housing including a fluid chamber which receives fluid entering through the supply section and which is in fluid communication with the delivery section for delivery of fluid out of the valve;
    a poppet member positioned within the fluid chamber and free to move within the fluid chamber during operation of the valve, the poppet including a seating surface portion and a rim portion which includes passages therethrough which permit flow of fluid through the poppet member, wherein said passages extend radially through the rim portion of the poppet into an interior portion thereof, and are of such a size and wherein the valve housing and the poppet are so configured and arranged, that substantially all of the forward flow of fluid moves through said passages into the interior portion of the poppet and then out of the valve;
    a delivery poppet seat defined within the fluid chamber, which the rim portion of the poppet contacts during forward flow of fluid through the valve; and
    a supply poppet seat defined within the fluid chamber which the seating surface portion of the poppet contacts to minimize backflow of fluid through the valve during backflow of fluid into the fluid chamber.

2. The valve of claim 1, wherein the delivery poppet seat and the supply poppet seat are defined at opposite ends of the fluid chamber.

3. The valve of claim 1, wherein the seating surface of the poppet is conical.

4. The valve of claim 1, wherein the supply poppet seat comprises a softer material than the material comprising the poppet, such that the supply poppet seat deforms to accommodate irregularities in the seating surface portion of the poppet.

5. The valve of claim 1, wherein the supply poppet seat includes a sharp circumferential edge for fluid-flow limiting contact with the seating surface portion of the poppet.

6. The valve of claim 1, wherein the poppet member has a sufficiently low inertia that it is able to move rapidly back and forth within the fluid chamber, in response to cyclical changes in fluid pressure at the fluid supply and delivery sections.

7. The valve of claim 1, wherein the fluid chamber and the poppet member are so configured and arranged that reversing the poppet member within the chamber results in fluid flow through the valve in an opposing direction.

8. The valve of claim 1, wherein the fluid supply section includes a tube and the delivery section includes a threaded portion.

9. The valve of claim 1, wherein the valve housing includes a compression fitting and a tube which supplies fluid to the fluid chamber.

* * * * *